United States Patent
Jakobsson et al.

(10) Patent No.: US 6,965,891 B1
(45) Date of Patent: Nov. 15, 2005

(54) METHOD AND MECHANISM FOR PARTITION PRUNING

(75) Inventors: Hakan Jakobsson, San Francisco, CA (US); Mohamed Zait, Sunnyvale, CA (US); Benoit Dageville, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 649 days.

(21) Appl. No.: 09/795,904

(22) Filed: Feb. 27, 2001

(51) Int. Cl.[7] .............................................. G06F 17/30

(52) U.S. Cl. ...................................... 707/5; 707/104.1

(58) Field of Search ................... 707/1–10, 100–104.1, 707/200–205

(56) References Cited

U.S. PATENT DOCUMENTS

| | | | | |
|---|---|---|---|---|
| 5,590,319 A | | 12/1996 | Cohen et al. | |
| 5,734,893 A | | 3/1998 | Li et al. | |
| 5,848,408 A | * | 12/1998 | Jakobsson et al. | 707/2 |
| 6,092,062 A | * | 7/2000 | Lohman et al. | 707/2 |
| 6,105,020 A | * | 8/2000 | Lindsay et al. | 707/2 |

* cited by examiner

*Primary Examiner*—Mohammad Ali
(74) *Attorney, Agent, or Firm*—Bingham McCutchen LLP (57) ABSTRACT

A method and system for performing partition pruning for queries that include a non-single table predicate is disclosed. According to an embodiment of the invention, this type of query is processed by performing a transformation of the query to include additional predicates comprising subqueries. The transformed query includes single table predicates on the partitioning column of the table being queried, based upon join predicates that exist in the original query.

60 Claims, 9 Drawing Sheets

Sales Table

| Sale_id | Store_id | Product_id | Sale_amount | Time_id |
|---|---|---|---|---|
| 50 | 1000 | 1001 | $100 | 5 |
| 100 | 2000 | 1051 | $500 | 10 |
| 150 | 1000 | 1100 | $50 | 15 |
| 200 | 3000 | 1051 | $2000 | 20 |
| 250 | 4000 | 1100 | $50 | 25 |
| 300 | 2000 | 1001 | $200 | 30 |

METHOD AND MECHANISM FOR PARTITION PRUNING

SUMMARY OF THE INVENTION

The invention relates to computer systems, and more particularly, to a method and mechanism for partition pruning in a database system. Partitioning in a database system generally refers to the process of decomposing an object into a greater number of relatively smaller objects. Smaller objects are often easier to manage and more efficient to search than larger objects. Thus, database systems utilize partitioning to decompose objects such as tables and indexes into smaller and more manageable pieces or "partitions."

Figure 1A:
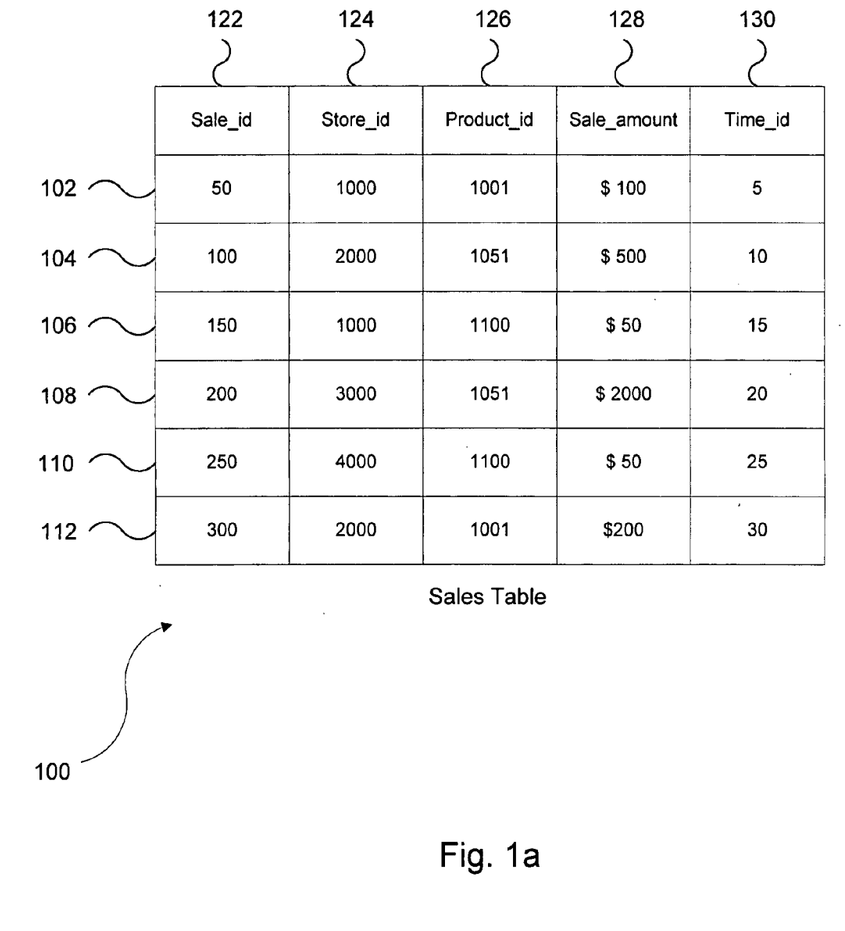
FIG. 1a represents an example of a Sales "fact" table.

Referring to FIG. 1a, a Sales Table 100 is shown containing a sample set of sales figures for a company. Each row contains a distinctive sales_id value (column 122) to uniquely reference a sale, as well as a store_id value (column 124) containing the system identification number of the store in which the sale was made, a product_id value (column 126) containing the system identification number of the product sold, a sales amount for the sale (column 128), and a time_id value (column 130) containing the system identification number for the date of the sale. Consider if it is desired to maintain this table as three separate partitions based upon the value in the "sales_amount" column 128. In particular, assume it is desired to form a first partition for all sales data corresponding to sales amount between $1 and $100, a second partition corresponding to all sales amounts between $101 and $1000, and a third partition corresponding to all sales amounts between $1001 and $2000.

The following Structured Query Language ("SQL") statement can be used to create this partitioned table as three separate partitions (using the Oracle 8i database system available from Oracle Corporation of Redwood Shores, Calif.):

```
CREATE TABLE Sales (   sale_id        INTEGER,
                       store_id       INTEGER,
                       product_id     INTEGER,
                       sales_amount   NUMBER(10),
                       time_id        INTEGER  )
PARTITION BY RANGE ( sales_amount )
     (PARTITION p0 VALUES LESS THAN (101) TABLESPACE TS0,
      PARTITION p1 VALUES LESS THAN (1001) TABLESPACE TS1,
      PARTITION p2 VALUES LESS THAN (2001) TABLESPACE TS2);
```

Figure 1B:
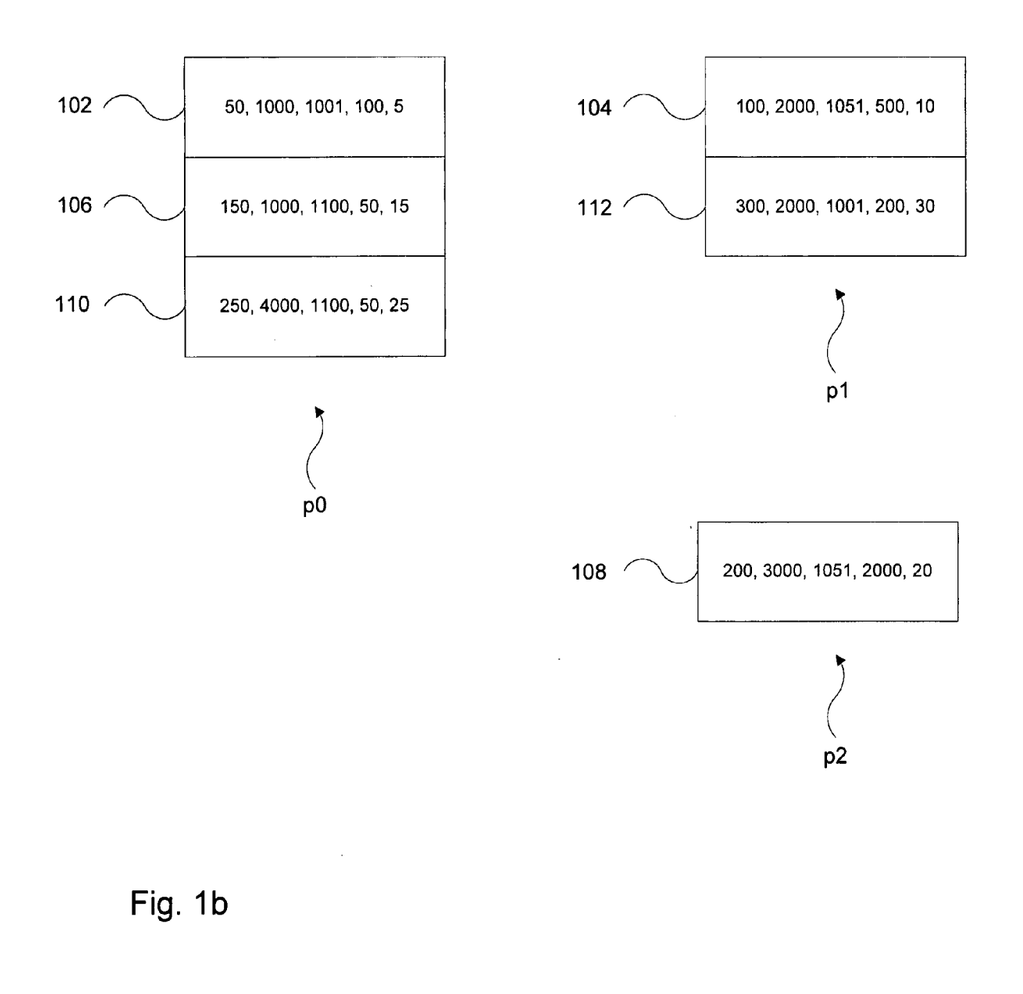
FIG. 1b shows the Sales Table of FIG. 1a as three separate partitions.

FIG. 1b shows the three resulting partitions P0, P1, and P2 for the information logically contained in Sales Table 100. Partition P0 contains all rows in Sales Table 100 which have a sales_amount value less than $101 (rows 102, 106, and 110), partition P1 contains all rows having a sales_amount value from $101 to $1000 (rows 104 and 112), and partition P2 contains all rows having a sales_amount value from $1001 to $2000 (row 108).

Several advantages exist once a data object has been partitioned. As just one example, "partition pruning" can be used to more efficiently execute a query upon a partitioned table. If a database query is issued against a table and the query contains a search term that is limited by a certain range or value corresponding to a partitioning criteria, then only partitions having the desired range or value are searched; all other partitions outside the desired range are "pruned" from the search. Compared to non-partitioned tables, this type of partition pruning significantly reduces the volume of data that must be searched, thereby decreasing the response time and reducing the expense/overhead of responding to the query.

For example, consider if it is desired to search for all entries in the Sales Table 100 that have a sales amount equal to $25. The following example query may be used to perform this search:

SELECT * FROM Sales
WHERE sale_amount=25;

If this query is applied to Sales Table 100 having the partitioning scheme shown in FIG. 1a, then it is clear that only partition P0 must be searched to satisfy the query, since only this partition has entries having the correct range of values in the sale_amount column. Partitions P1 and P2 contain entries that are outside of the desired range. Therefore, a database optimizer would only consider partition P0 and would prune partitions P1 and P2 when executing this query.

In effect, the "predicate" in the WHERE clause for this query (i.e., the statement "Sales_Table.sale_amount=25") provides information that allows the database optimizer to determine which partitions are relevant to the query. Based upon the query predicate, only relevant partitions are retained for the search while irrelevant partitions are pruned. Here, the WHERE clause for the query includes a "single table predicate" that references partition column(s) for only a single table.

Known approaches to partition pruning will properly and/or efficiently operate only if a query includes single table predicates. However, it is quite possible for queries to include predicates that are not single table predicates, in which the predicate includes a condition that relates to information for another table. This may occur, for example, for queries that search for data in databases having the "star schema" structure. In relational database systems, a star schema is utilized to organize information such that a fact table contains primary information relevant to the table as well as references to corresponding rows in one or more dimension tables. Rather than storing or duplicating information that already exists in the dimension tables, the foreign key/column values reference the appropriate row in a dimension table containing the more detailed information relevant to a row in the fact table. The "lookup" process to match a row in the fact table with a corresponding row in a dimension table is performed by matching a foreign key/column value in the fact table with a primary key/column value in a dimension table.

To illustrate the organization of star schemas, reference is made back to the Sales Table 100 of FIG. 1a. Sales Table 100 is an example of a fact table having a number of attributes, which can be represented by the following (with the table attributes in the parenthesis):

Sales (sales_id, stored_id, product_id, sales_amount, time_id)

In this example, the store_id, product_id, and time_id values represent foreign columns that reference more detailed information in dimension tables. The following are examples of table representations for dimension tables corresponding to the store_id, product_id, and time_id values, with column names listed in the parenthesis:

Store (store_id, city, state)
Product (product_id, product_name, product_category)
Time (time_id, date, quarter)

Figure 2:
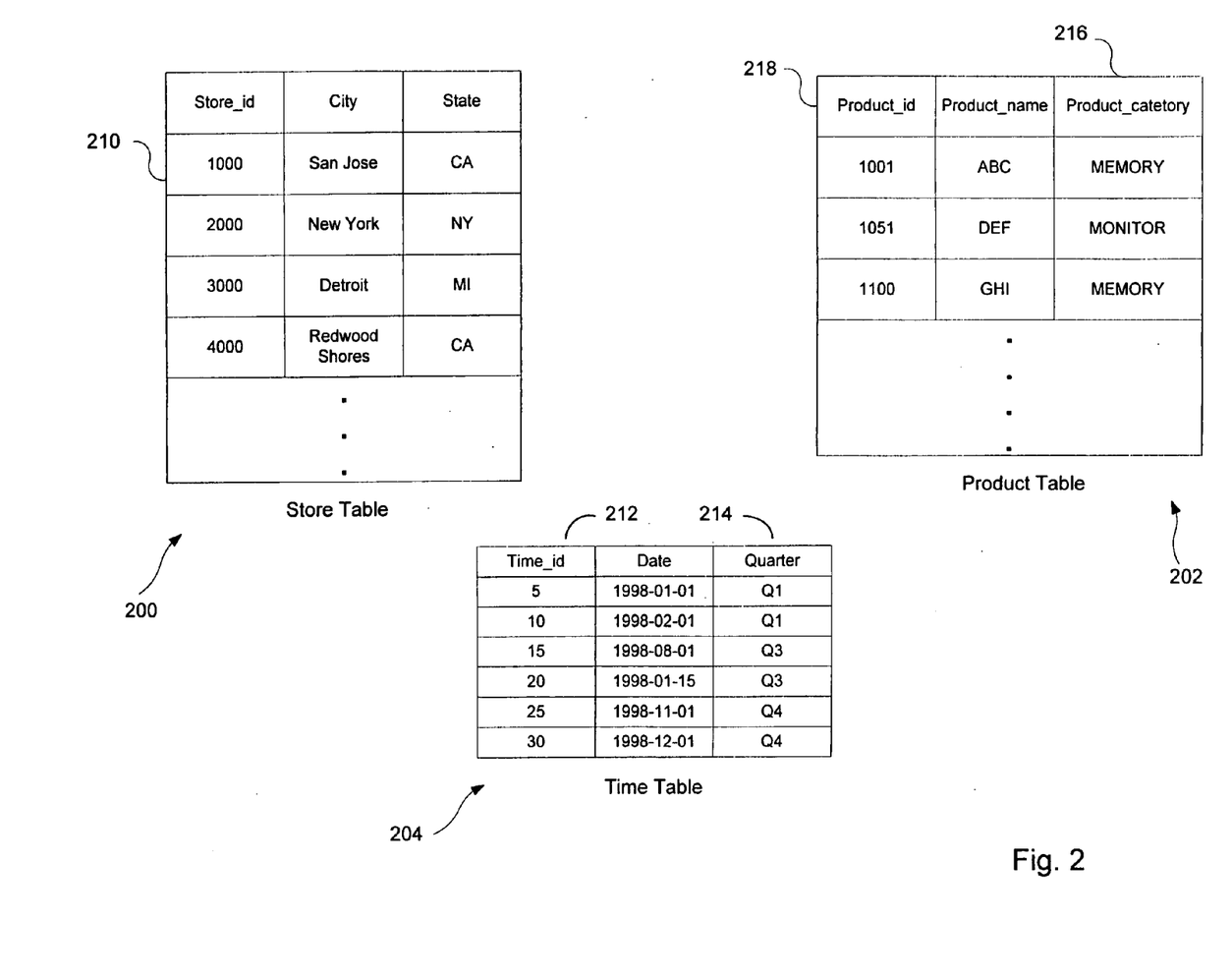

Each of these tables is illustrated with sample data values in FIG. 2 (i.e., Store Table 200, Product Table 202, and Time Table 204).

Detailed address information for the individual stores are located in the Store Table 200 rather than having that information listed in each row of the Sales Table 100. One reason to utilize this structure is that the number of sales transactions recorded in a Sales Table 100 could be much greater than the number of stores engaging in the sales transactions. Thus, storing address information in each row of the Sales Table 100 could result in many duplicative entries of the same information. To illustrate, note that row 102 of the Sales Table 100 includes the value "1000" in the store_id column 124. Row 106 of the Sales Table 100 has the same value in its store_id column 124. Rather than storing the same detailed information for the corresponding store in both rows, that information is placed in the Store dimension table 200. To obtain detailed address information for the store having this store_id value, the dimension table corresponding to this foreign column value (i.e., the Store Table 200) is searched for a row having a primary column with the same value. This is found at row 210 of Store table 200. Thus, it is seen that "San Jose, Calif." is the address for the store making the sales referenced in both rows 102 and 104 of Sales Table 100. In a similar manner, Product Table 202 and Time Table 204 are additional dimension tables containing detailed information corresponding to the product_id and time_id values, respectively, located in Sales Table 100.

Consider if the following query is placed against the tables shown in FIGS. 1a and 2:

| | |
|---|---|
| SELECT | Product.product_name, SUM(Sales.sale_amount) |
| FROM | Sales, Product, Time |
| WHERE | Sales.time_id = Time.time_id AND Time.Quarter = 'Qi' AND |
| | Sales.product_id = Product.product_id AND |
| | Product.product_category = 'MEMORY'; |

This query seeks the product name and sales amount totals for all entries in which the sale took place in the first calendar quarter (i.e., "Q1") and in which the product category is "MEMORY."

Assume that Sales table 100 is partitioned upon the time_id column 130 and product_id column 126. For example, consider if the Sales table 100 is partitioned upon the time_id column 130 based upon the calendar quarter in which a sale is made, with the calendar quarter information for the sale stored in the Time table 204. In particular, the partitioning column (i.e., time_id column 130) is a foreign key corresponding to the time_id column 212 in the Time table 204, and the partitioning is performed such that the time_id value domain in a given partition corresponds to the sales made in a particular sales quarter. Also consider if the Sales table 100 is partitioned upon the product_id column 126 based upon product category information stored in the product table 202. Thus, the partitioning column 126 is a foreign key corresponding to the product_id column 218 of Product table 202 and partitioning is performed such that the product_id value domain in a given partition corresponds to the product category of a sale. Even if the Sales table 100 is partitioned based upon the time_id column 130 and product_id column 126, known database optimizers would have difficulty performing partition pruning for this query since it is not limited by single table predicates for the partitioning columns.

One approach for partition pruning under this circumstance is to perform nested-loop joins. In this approach, multiple joins are utilized to map the conditions of the query predicate to partitioning information in partitioning columns of dimension tables. Joins are driven from the dimension tables, in which entries are retrieved from dimension table column value(s) or ranges of values specified in upon the query predicate. Each of the retrieved entries from a dimension table results in a corresponding join operation that is used to identify a relevant partition of the fact table. However, numerous drawbacks exist for this approach. For example, nested-loop joins are inefficient to join tables in a decision support (DSS) environment where such queries are relatively common.

The present invention provides a method and system for performing partition pruning for queries that may not be limited to a single table predicate. According to an embodiment of the present invention, this type of query is processed by performing a transformation of the query to include additional predicates comprising one or more subqueries. The transformed query includes single table predicates on the partitioning column of the table being queried, based upon join predicates that exist in the original query. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 2 represents examples of "dimension" tables corresponding to the table of FIG. 1a.

DETAILED DESCRIPTION

The present invention comprises a method and mechanism for partition pruning where no single table predicate exists on at least one of the partitioning columns of a partitioned table. This situation may arise for a star query that requires a join between a fact table and a number of dimension tables. For purposes of illustration only, the present explanation of the invention is made with reference to a star schema, in which a central table, referred to as a fact table, is connected to one or more other tables, called dimension tables, through foreign key/column-primary key/column relationship(s). However, it is noted that the present invention may equally be applied to other queries having non-single table predicates which do not involve the star schema structure.

Figure 3:
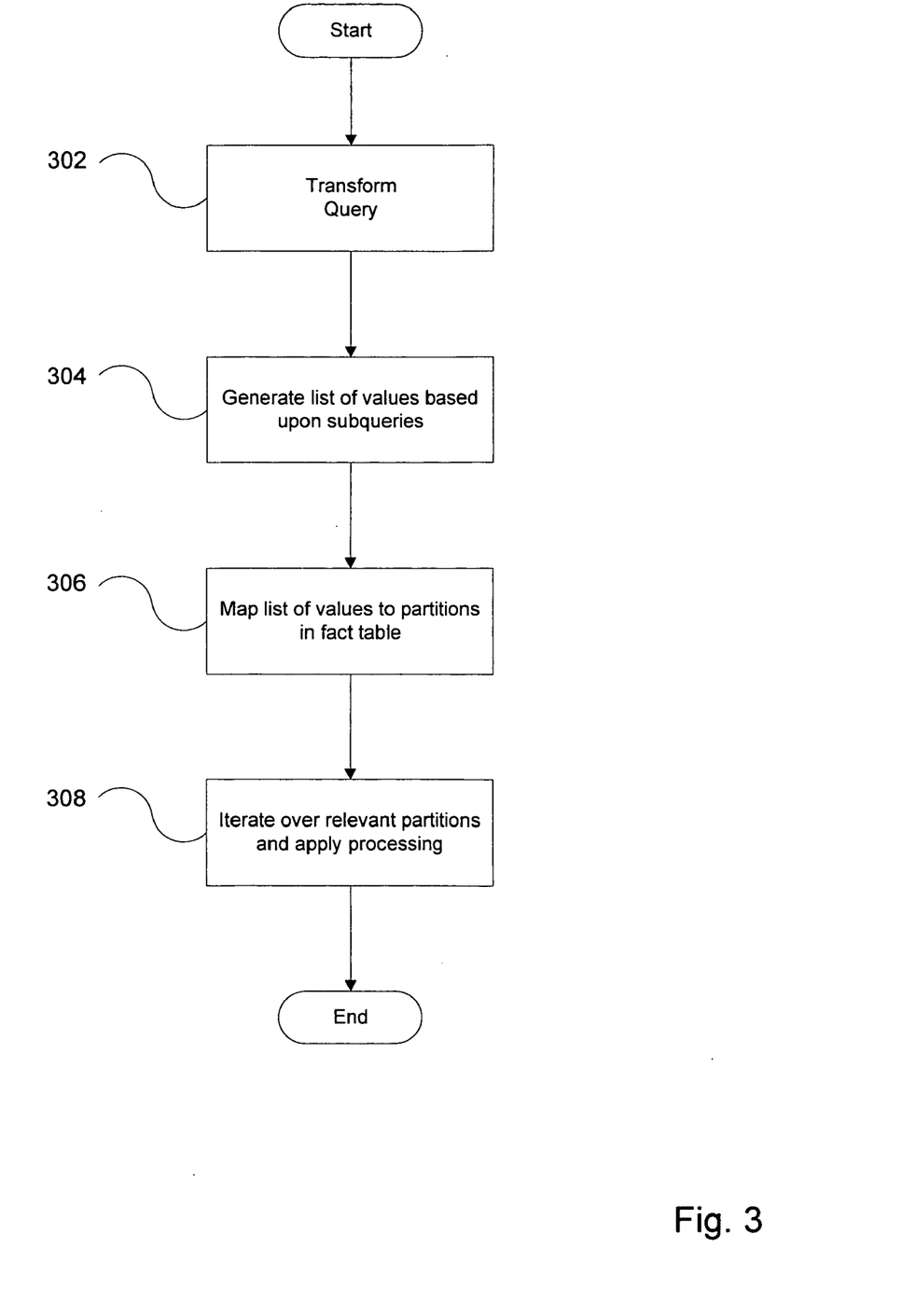
FIG. 3 depicts a flowchart of a process for partition pruning according to an embodiment of the invention.

FIG. 3 depicts a flowchart of a process for partition pruning according to an embodiment of the invention. The first step of the partition pruning process is to transform the query to include additional predicates (302). As described in more detail below, some or all of the non-single table predicates in the original query correspond to new predicates that include subqueries having single table predicate(s) on the partitioning column of the table being queried. The additional predicates are based upon join predicates that exist in the original query.

Executing the transformed query effectively causes a "list" of values to be returned for each partitioning column on the fact table (304). The list of values returned for each partitioning column is mapped against partitions in the fact table to determine which corresponding partitions are relevant to the query (306). For multiple-column partitioning, it is possible that multiple lists of values are returned, in which each list corresponds to a separate partitioning column. In this situation, the various lists are combined, e.g., using Cartesian arithmetic, to produce a single mapping. At 308, this is iterated over the relevant partitions and the requested processing is applied to the relevant partitions. The irrelevant partitions may thus be pruned from the query, e.g., implicitly pruned by only accessing the relevant partitions during step 308. Duplicate values in the list of returned identified partitions may be discarded to maximize performance of the pruning process.

To illustrate query transformation according to the invention, consider the following query pseudocode which is a typical format for a common class of queries against data in a star schema:

```
SELECT  *
FROM    fact_table, dimension_table_1, . . . dimension_table_n
WHERE   fact_table.f_column1 = dimension_table_1.p_column
        AND . . . fact.f_columnn = dimension_table_n.p_column
        AND dimension_table_1.column OPERATOR Value1
        AND . . . dimension_table_n.columnn OPERATOR Valuen
```

In this query format, there is a single fact table and multiple dimension tables listed as dimension_table_1 through dimension_table_n. The statement "fact_table.f_column1= dimension1.p_column" is a predicate that mandates that a value in a foreign column (or "foreign key" column) in the fact_table match a value in a primary column (or "primary key" column) in dimension_table_1. These types of predicates are referred to herein as join predicates. A similar statement exists for each dimension table that is to be joined to the fact table to satisfy the query. The statement "dimension_table_1. column OPERATOR Value1" is a search predicate that determines whether values in the specified column of dimension_table_1 match the value contained in Value 1 based upon the particular operator (e.g., =, >, =>) in the predicate.

In an embodiment of the invention, one or more join predicates directed to a constrained value in a search predicate similar to the following format:

fact_table.f_column1=dimension_table_1.p_column having a search predicate similar to the following example format:

dimension_table_1.column OPERATOR Value1 causes a transformation to include a new predicate that attempts to match values in "fact_table.f_column1" with the results returned by a subquery that searches for specific values for "dimension_table_1.p_column" in the table "dimension_table_1" in which the subquery search is constrained by the above predicate "dimension_table_1.column OPERATOR Value1". For example, the following format may be employed for the new predicates subquery in the WHERE clause of the query:

```
fact_table.f_column1=ANY          (SELECT
    dimension_table_1.p_column          from
    dimension_table1                    WHERE
    dimension_table_1.column OPERATOR Value1)
```

Those skilled in the art will realize that other predicate formats can be utilized in other contexts and can similarly be utilized to generate a new predicate or subquery based upon the particular original query being processed. Likewise, alternate transformation formats can be employed within the scope of the invention to include single table predicates on the partitioning column of the table being queried. For example, the following is an alternate format for an additional predicate to be added to the WHERE clause:

```
fact_table.f_column1          IN          (SELECT
    dimension_table_1.p_column          from
    dimension_table_1                   WHERE
    dimension_table_1.column OPERATOR Value1)
```

The following represents pseudocode for a process for transforming a query according to an embodiment of the invention:

```
For each column Ci of the partitioning key of Fact table F
    IF (query contains a single table predicate on F.Ci)
    {
        Append the predicate to the pruning predicate list for F;
    }
    ELSE
    {
        IF (query contains a join predicate on F.Ci)
        {
            Let Di be the (dimension) table that joins with F through
            that join predicate;
            IF (query contains a single table predicate on any
                Di column
                AND
```

```
            the cost of the new subquery predicate based on
            Di has an acceptable cost/benefit ratio)
         {
            Generate a new predicate;
            Append the new predicate to the pruning predicate
            list for F;
         }
      }
   }
}
```

If the single table predicate on Di is on the same column used to join with F.Ci, then a single table predicate on F.Ci is transitively generated which would be handled via the first "IF" clause rather than the last "IF" clause.

The process maintains a "pruning" predicate list comprising predicates useful for determining partitions corresponding to the query. For each column of the partitioning key of the fact table, the single table predicates are added to the pruning predicate list pursuant to the first "IF" clause of the process pseudocode. For non-single table predicates, a determination is made regarding whether the query contains a single table predicate for a column of a Dimension table that joins with the Fact table through the join predicate. In an embodiment, a determination is also made regarding the cost of generating/executing a new predicate versus the expected benefit of the new predicate, e.g., determining whether the benefit of the new predicate exceeds its costs. If appropriate after making these determinations, a new predicate is generated and is added to the pruning predicate list.

To further illustrate the invention, consider if Sales table 100 of FIG. 1a is partitioned upon the product_id column 126 based upon the product category of the product that is sold. The product category information for a sale is located in the Product_category column 216 of the Product table 202. In particular, assume that a first partition 402 is established for all rows in Sales table 100 corresponding to the product category "MEMORY" and a second partition 404 is established for all rows in Sales table 100 corresponding to the product category "MONITOR". By tracing the product_id values in column 126 of Sales table 100 to their corresponding rows in Product table 202 having the same values in column 218 (e.g., tracing the foreign key/primary key relationship for product_id values), it can be seen that rows 102, 106, 110, and 112 of Sales table 100 correspond to the "MEMORY" product category and rows 104 and 108 correspond to the "MONITOR" product category.

Figure 4:
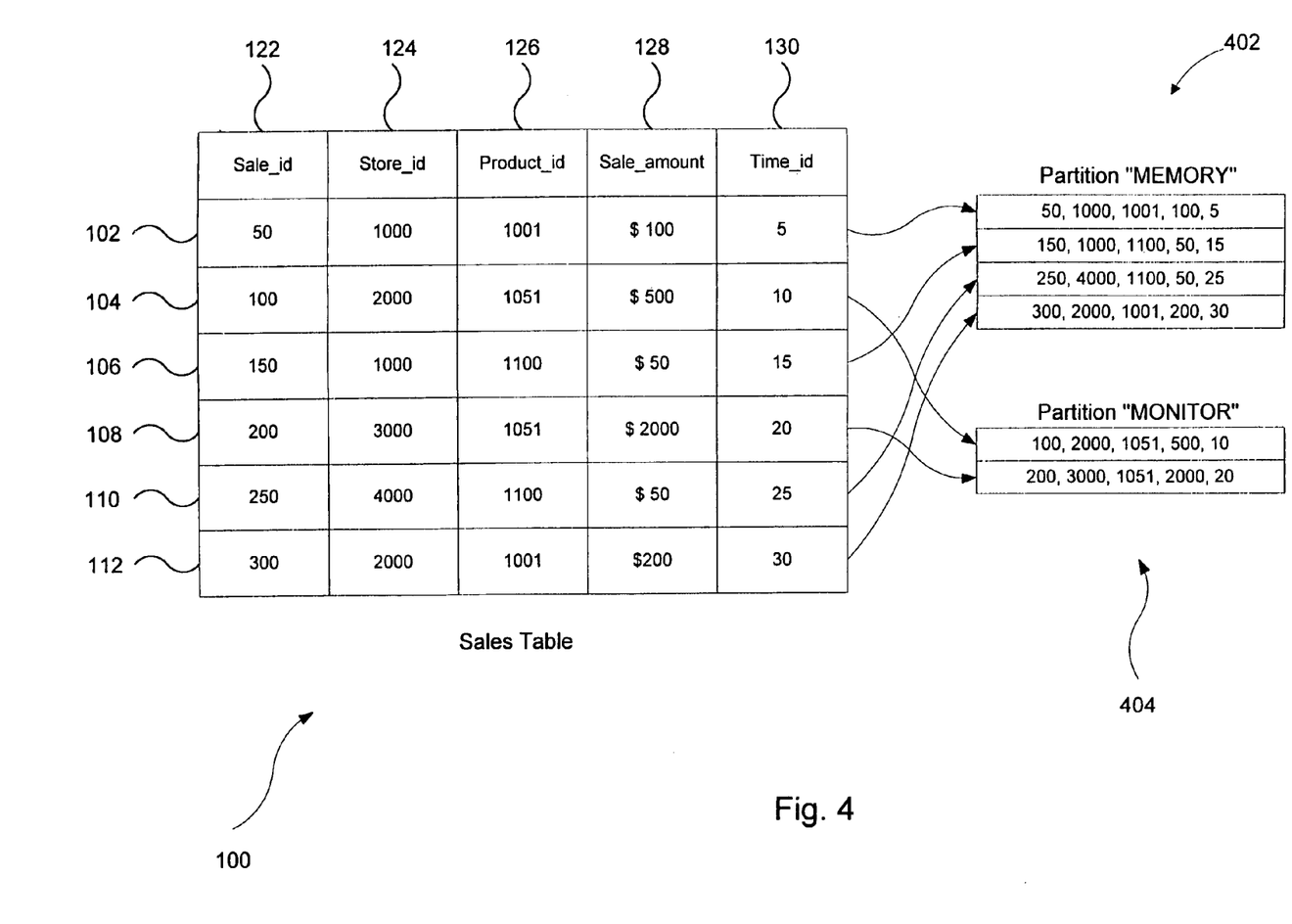
FIGS. 4 and 5 depict examples of partitioning schemes applied to the tables of FIGS. 1a and 2.

This partitioning scheme is shown in FIG. 4, in which rows 102, 106, 110, and 112 are all stored in a first partition 402 established for all rows in Sales table 100 in which the product_id value corresponds to a product category of "MEMORY". Similarly, rows 104 and 108 are stored in a second partition 404 because each of these rows contains a product_id value that corresponds to a product category of "MONITOR".

In an embodiment, this type of partitioning can be performed by identifying which product_id values, which are the foreign key values in column 216 of Sales table 100 and primary key values in column 218 of Product table 202, correspond to either the product category "MEMORY" or the category "MONITOR". A SQL query can be issued against the product table 202 to make this type of identification. Once theses associations have been identified, a partitioning criteria is established against Sale table 100 to properly route rows to the appropriate partition. Alternatively, this type of partitioning may be implemented using the mechanism disclosed in co-pending U.S. application Ser. No. 09/796,001, entitled "Method And Mechanism For Database Partitioning", filed on even date herewith, which is hereby incorporated by reference in its entirety.

Consider the following query which seeks the sales_id of all sales in Sales table 100 corresponding to a product category of "MEMORY" (with reference to the database tables of FIGS. 1a and 2 and the partitioning scheme as shown in FIG. 4):

```
SELECT    Sales.sale_id
FROM      Sales, Product
WHERE     Sales.product_id = Product.product_id AND
          Product.product_category = 'MEMORY';
```

Partition pruning can be usefully employed for this query to prune an irrelevant partition (i.e., partition 404). According to an embodiment of the invention, each column of a partitioning key of the fact table (Sales table 100) is processed as described with reference to the pseudocode set forth above. For each column, a determination is made whether there exists any non-single table predicates that should be transformed. In this example, the WHERE clause does contain such a non-single table predicate. Thus, a new predicate is generated relating to the partitioning condition as expressed in the WHERE clause, such as the following:

Sales.product_id=ANY (SELECT product.product_id
      FROM Product
      WHERE product.product_category='MEMORY')

The resulting transformed query with the additional predicate added to the original WHERE clause would look like the following in an embodiment of the invention:

```
SELECT    Sales.sales_id
FROM      Sales, Product
WHERE     Sales.product_id = Product.product_id AND
          Product.product_category = 'MEMORY' AND
          Sales.product_id = ANY (SELECT Product.product_id
          FROM Product WHERE Product.product_category =
          "MEMORY");
```

Partition pruning occurs based upon values returned by the added predicate. Referring to FIG. 4, it can be seen that only rows corresponding to partition 402 are returned; thus, only that partition is searched to satisfy the query. Since no rows corresponding to partition 404 are returned, partition 404 is pruned, either implicitly or explicitly, from the query execution.

To further illustrate the invention for multi-column partitioning, consider the following query which computes, by product name, the total sales in the first calendar quarter for the product category "MEMORY" (with reference to the database tables shown in FIGS. 1a and 2):

| | |
|---|---|
| SELECT | Product.product_name, SUM(Sales.sale_amount) |
| FROM | Sales, Product, Time |
| WHERE | Sales.time_id = Time.time_id AND Time.Quarter = 'Q1' AND |
| | Sales.product_id = Product.product_id AND |
| | Product.product_category = 'MEMORY'; |

For purposes of this example, assume that Sales table 100 is partitioned upon the time_id column 130 based upon the calender quarter of a sale, with the calender quarter information stored in the Time table 204. Also assume that Sales table 100 is partitioned upon the product_id column 126 based upon product category information stored in the product table 202.

Figure 5:
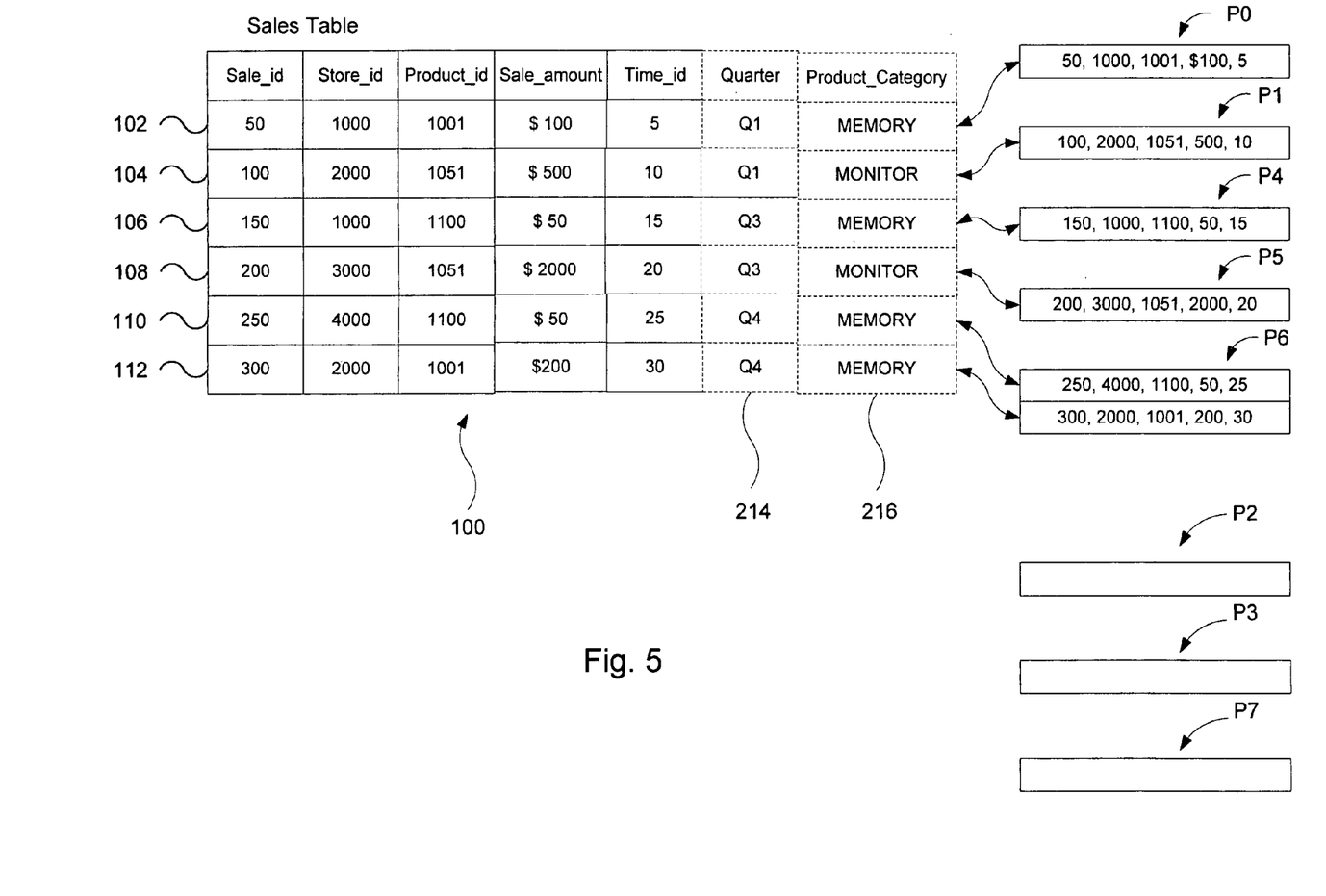

FIG. 5 pictorially represents this type of partitioning against the tables of FIGS. 1*a* and 2 in which the database system: (a) creates partition p0 for all rows in the Sales Table 100 corresponding to Q1 and the product category "MEMORY"; (b) creates partition P1 for all rows corresponding to Q1 and "MONITOR"; (c) creates a partition P2 for all rows corresponding to Q2 and "MEMORY"; (d) creates partition P3 for rows corresponding to Q2 and "MONITOR"; (e) creates a partition P4 for rows corresponding to Q3 and "MEMORY"; (f) creates partition P5 for all rows corresponding to Q3 and "MONITOR"; creates partition P5 for all rows corresponding to Q4 and "MEMORY"; and, (g) creates partition P7 for all rows corresponding to Q4 and "MONITOR". FIG. 5 also shows a logical join between Sales Table 100, Time table 204, and Product Table 202 that corresponds to partitioning criteria used for the disclosed partitioning.

According to an embodiment of the invention, join predicates and search predicates corresponding to a partitioning condition upon the Sales Table 100 are utilized to generate additional predicates/subqueries. These new predicates/subqueries are added to the original query, and the result set from executing the new subqueries determine the relevant partitions of interest to the query.

If the Sales Table 100 is partitioned upon the time_id column 130 based upon the values in the Quarter Column 214 in the Time Table 204, then the join predicate/search predicate relating to this partitioning condition are utilized to generate a new predicate/subquery, such as the following:

Sales.time_id=ANY (SELECT Time.time_id FROM Time WHERE Time.Quarter='Q1')

Similarly, if the Sales Table 100 is partitioned upon the product_id column 126 based upon the values in the product_catetory column 216 in Product Table 202, then the joint predicate/search predicate relating to this partitioning condition are utilized to generate a new predicate/subquery, such as the following:

Sales.product_id=ANY (SELECT Product.product_id FROM Product WHERE Product.product_category='MEMORY')

The resulting transformed query with these additional predicates/subqueries added to the original WHERE clause would look like the following:

| | |
|---|---|
| SELECT | Product.product_name, SUM(Sales.sale_amount) |
| FROM | Sales, Product, Time |

-continued

| | |
|---|---|
| WHERE | Sales.time_id = Time.time_id AND Time.Quarter = 'Q1' AND |
| | Sales.product_id = Product.product_id AND |
| | Product.product_category = 'MEMORY' AND |
| | Sales.product_id = ANY (SELECT Product.product_id FROM |
| | Product WHERE Product.product_category = 'MEMORY') AND |
| | Sales.time_id = ANY (SELECT Time.time_id FROM Time WHERE Time.Quarter = 'Q1'); |

Partition pruning would be accomplished based upon rows returned by the added subqueries. Referring to FIG. 5, it can be seen that only row 102 from Sales Table 100 is returned based upon these subqueries. At run-time, the returned values are mapped to partition identifiers, which constitute the set of partitions to be accessed. Thus, only partition p0 is identified as having values corresponding to the query search terms. Therefore, all other partitions in FIG. 5 can be pruned prior to a scan of the table rows.

A similar process is followed even if the original query had a date range in the search predicate, rather than a range of quarters. Under this circumstance, a similar type of transformation is performed against the original star query, in which a subquery is added selecting the join column from the dimension table where the values in the dimension table column equals the desired value. Like the example shown above, a list of values would be returned from executing the subquery, based upon a join between the relevent rows of the fact and dimension tables. This returned list of values can be translated into a corresponding list of partitions. In this manner, a translation occurs between the unit of measurement used in original query (range of dates) and the unit of measurement used for partitioning the fact table (range of calendar quarters).

Figure 6:
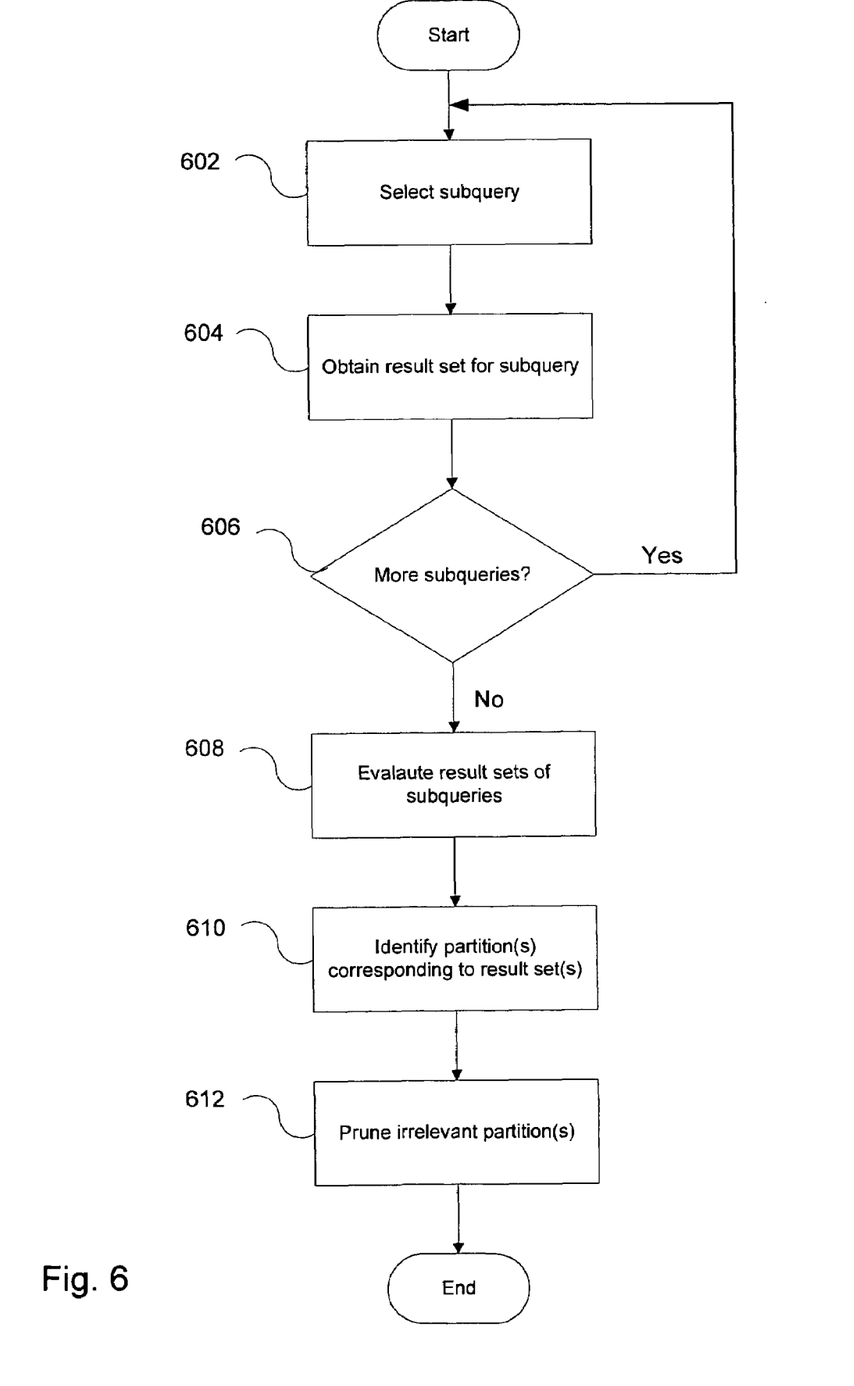
FIG. 6 depicts a process for partition pruning according to an embodiment of the invention.

FIG. 6 depicts a process flow of an embodiment of the invention for partition pruning. At 602, a subquery in the transformed star query is selected for processing. At 604, the result set for the executed subquery is obtained. If more subqueries need to be processed, then steps 602 and 604 are repeated (606). If no more subqueries are to be processed, then the result sets returned from the executed subqueries are combined and analyzed (608). In an embodiment of the invention, the action consists of determining a Cartesian product between the various result sets. According to an embodiment of the invention, partition pruning for a table that is partitioned upon multiple columns in a fact table requires a result set to be returned for some or all of the partitioning columns.

In an embodiment, a subquery predicate is generated for all partitioning columns when the HASH partitioning method is used. With HASH partitioning, a value associated with a data record is applied to a hash function to produce a hash value. Separate partitions are established corresponding to different hash values, and data records that hash to a particular value are stored within the partition associated with the hash value. In an embodiment, not all partitioning columns result in a subquery predicate if RANGE partitioning is used. Instead, predicates are generated on a subset of the partitioning column that constitutes a prefix of the partitioning key. RANGE partitioning refers to a partitioning scheme in which separate partitions are established corresponding to different ranges of values for a data record, in which a data record is stored in the particular partition corresponding to its data range. However, it is noted that predicates may be generated for subsets even when predicates can be generated for all columns. This decision can be driven by performing a cost/benefit analysis for the additional predicate. Thus, in an embodiment, a subquery may be generated for some or all of the partitioning columns.

The Cartesian product of the values in the various result sets generates the value combinations that determine which partition is relevant to the query. The set of values that remain correspond to the partitions of interest to the query, and a mapping of these combinations to the partition definitions determines the set of partitions that must be searched to satisfy the query (610). All other partitions can thus be pruned from the query process (612).

The present invention is also applicable to partition pruning involving multiple levels of dimension tables, in which dimension tables have their own dimension tables. As an example, consider the following query against a three-level organization of fact/dimension tables:

```
SELECT   *
FROM     fact_table, dimension_level_1, dimension_level_2
WHERE    fact_table.foreigncolumn =
         dimension_level_1.primary_column AND
         dimension_level_1.foreigncolumn =
         dimension_level_2.primarycolumn AND
         dimension_level_2.column2 OPERATOR Value;
```

In this example, fact_table has a foreign key/column-primary key/column relationship with the dimension_level_1 table, and the dimension_level_1 table has a foreign key/column-primary key/column relationship with the dimension_level_2 table. This example contains a search predicate (constraint) upon the lowest level of the dimension tables. Assume that fact_table is partitioned based upon the lowest level dimension_level_2.column2 column.

According to an embodiment of the invention, the original query is transformed to establish a join condition between all three levels of tables to obtain a set of values that can be translated into a set of relevant partitions. In the present embodiment, this is implemented by creating a join condition in the new predicate/subquery that connects each lower level dimension table back to its immediately higher level dimension table for each partition criteria that requires such a join. The format of the additional subquery is similar to the example format set forth above, except that the subquery will include a statement referencing the relevant lower level dimension tables.

In the above example, the join predicate between the first level dimension table and the second level dimension table is:
   dimension_level_1.foreigncolumn=dimension_level_2
      .primarycolumn with a search predicate on the second level dimension table:
   dimension_level_2.column2 OPERATOR Value resulting in the additional predicate/subquery having the following format according to an embodiment of the invention:

```
fact_table.foreigncolumn = ANY (SELECT
     dimension_level_1.primarycolumn
         FROM dimension_level_1, dimension_level_2
         WHERE dimension_level_1.foreigncolumn =
             dimension_level_2.primarycolumn AND
             dimension_level_2.column2 OPERATOR Value)
```

The transformed subquery would therefore appears as follows:

```
SELECT   *
FROM     fact_table, dimension_level_1, dimension_level_2
WHERE    fact_table.foreigncolumn =
         dimension_level_1.primary_column AND
         dimension_level_1.foreigncolumn =
         dimension_level_2.primarycolumn AND
         dimension_level_2.column2 > 50 AND
         fact_table.foreigncolumn = ANY (SELECT
             dimension_level_1.primarycolumn
                 FROM dimension_level 1, dimension_level_2
                 WHERE dimension_level_1.foreigncolumn =
                     dimension_level_2.primarycolumn AND
                     dimension_level_2.column2 OPERATOR Value);
```

Execution of the subquery results in a set of values that can be used to determine the exact partition needed to satisfy the query.

A cost-benefit analysis can be performed to determine the relative benefit of performing the disclosed partition pruning process. The database query optimizer can be configured to calculate or approximate the costs of executing additional subqueries in addition to the costs of executing the original query. The cost benefit analysis determines if the benefit of partition pruning is worth incurring the extra costs associated with the additional subqueries. One measure of the costs can be based upon the number of additional subqueries that must be performed and the expense of executing these additional subqueries. Another measure of the costs is the approximate number of rows that will be returned for the subqueries, particularly if the total of the cartesian product of the returns rows for the subqueries are used to identify the exact partitions relevant to the original query. If a database system transforms star queries and uses the results to access indexes on a fact table, then the cost of executing the subqueries can be shared by both the partition pruning iterator as well as the index access process. Such as process for transforming subqueries to access an index is disclosed in U.S. Pat. No. 5,848,408, which is hereby incorporated by reference in its entirety.

The present invention is also applicable for partition pruning of composite partitioned data objects. Composite partitioning, also referred to as multi-dimensional partitioning, is implemented based upon dividing a table using multiple types of partitioning schemes, e.g., a combination of HASH and RANGE partitioning. The above-described process for generating additional predicates is applied independently to each partitioning dimension if the table is partitioned along several dimensions.

System Architecture Overview

Figure 7:
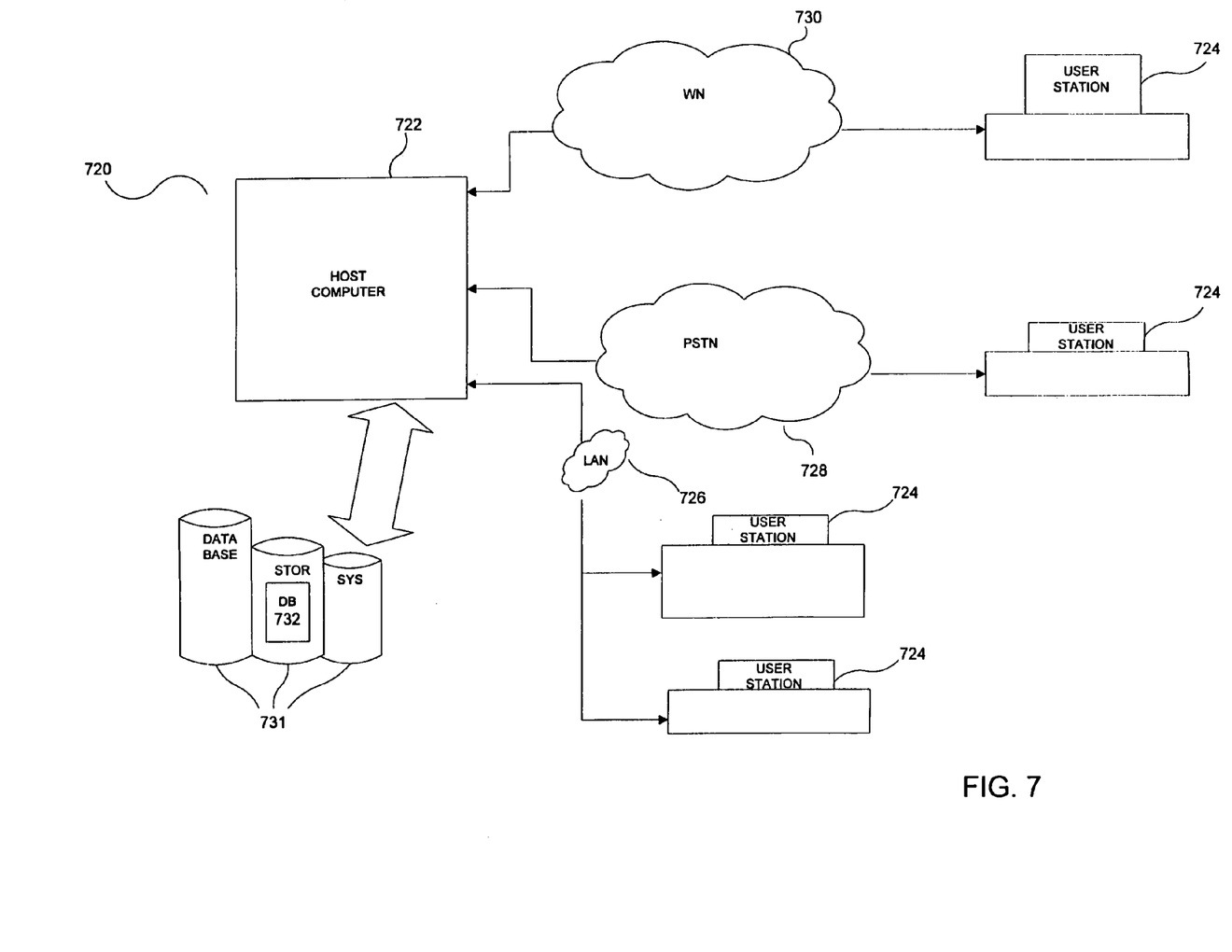
FIG. 7 is a diagram of a system architecture with which the present invention can be implemented.

Referring to FIG. 7, in an embodiment, a computer system 720 includes a host computer 722 connected to a plurality of individual user stations 724. In an embodiment, the user stations 724 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 724 are connected to the host computer 722 via a local area network ("LAN") 726. Other user stations 724 are remotely connected to the host computer 722 via a public telephone switched network ("PSTN") 728 and/or a wireless network 730.

In an embodiment, the host computer 722 operates in conjunction with a data storage system 731, wherein the data storage system 731 contains a database 732 that is readily accessible by the host computer 722. Note that a multiple tier architecture can be employed to connect user stations 724 to a database 732, utilizing for example, a middle application tier (not shown). In alternative embodiments, the database 732 may be resident on the host computer, stored, e.g., in the host computer's ROM, PROM, EPROM, or any other memory chip, and/or its hard disk. In yet alternative embodiments, the database 732 may be read by the host computer 722 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 722 can access two or more databases 732, stored in a variety of mediums, as previously discussed.

Figure 8:
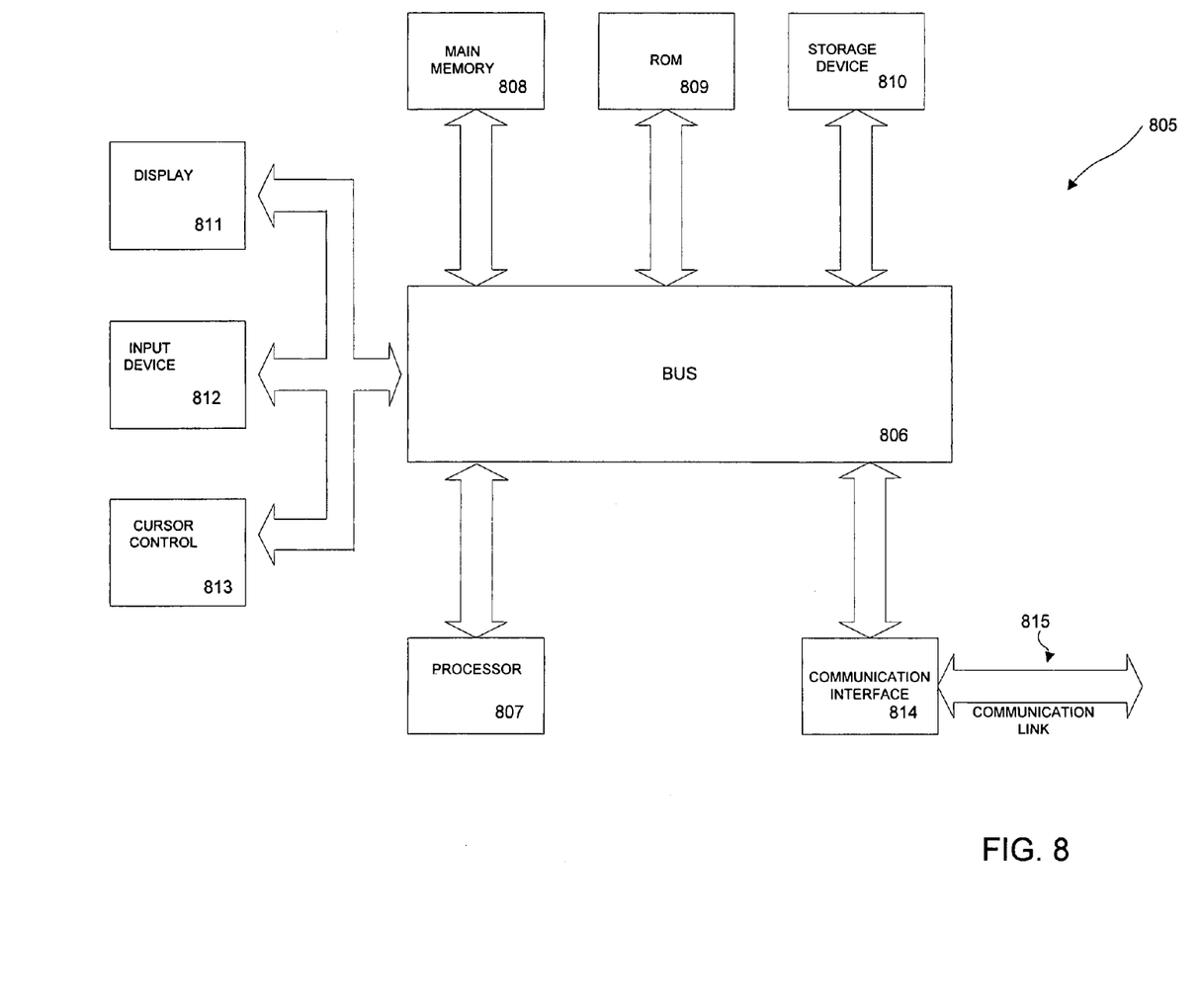
FIG. 8 is an additional diagram of a system architecture with which the present invention can be implemented.

Referring to FIG. 8, in an embodiment, each user station 724 and the host computer 722, each referred to generally as a processing unit, embodies a general architecture 805. A processing unit includes a bus 806 or other communication mechanism for communicating instructions, messages and data, collectively, information, and one or more processors 807 coupled with the bus 806 for processing information. A processing unit also includes a main memory 808, such as a random access memory (RAM) or other dynamic storage device, coupled to the bus 806 for storing dynamic data and instructions to be executed by the processor(s) 807. The main memory 808 also may be used for storing temporary data, i.e., variables, or other intermediate information during execution of instructions by the processor(s) 807. A processing unit may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807.

A processing unit may be coupled via the bus 806 to a display device 811, such as, but not limited to, a cathode ray tube (CRT), for displaying information to a user. An input device 812, including alphanumeric and other columns, is coupled to the bus 806 for communicating information and command selections to the processor(s) 807. Another type of user input device may include a cursor control 813, such as, but not limited to, a mouse, a trackball, a fingerpad, or cursor direction columns, for communicating direction information and command selections to the processor(s) 807 and for controlling cursor movement on the display 811.

According to one embodiment of the invention, the individual processing units perform specific operations by their respective processor(s) 807 executing one or more sequences of one or more instructions contained in the main memory 808. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 807. Such a medium may take many forms, including, but not limited to, non-volatile, volatile and transmission media. Non-volatile media, i.e., media that can retain information in the absence of power, includes the ROM 809. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 807 can retrieve information. Various forms of computer-usable media may be involved in providing one or more sequences of one or more instructions to the processor(s) 807 for execution. The instructions received by the main memory 808 may optionally be stored on the storage device 810, either before or after their execution by the processor(s) 807.

Each processing unit may also include a communication interface 814 coupled to the bus 806. The communication interface 814 provides two-way communication between the respective user stations 824 and the host computer 822. The communication interface 814 of a respective processing unit transmits and receives electrical, electromagnetic or optical signals that include data streams representing various types of information, including instructions, messages and data. A communication link 815 links a respective user station 824 and a host computer 822. The communication link 815 may be a LAN 726, in which case the communication interface 814 may be a LAN card. Alternatively, the communication link 815 may be a PSTN 728, in which case the communication interface 814 may be an integrated services digital network (ISDN) card or a modem. Also, as a further alternative, the communication link 815 may be a wireless network 730. A processing unit may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. For example, note that the above process, while described with specific reference to relational database tables, can be equally applied to other objects in the database system, such as partitioned indexes, or even to objects outside of a relational database system, such as object-based database objects. The specification and drawings are, accordingly, to be regarded in an illustrative rather than restrictive sense.

What is claimed is:

1. A method of executing a query, the query comprising a non-single table predicate that references a first database object and a second database object, the method comprising:
   transforming said query into a transformed query that includes a new predicate, said new predicate corresponding to said non-single table predicate, said new predicate comprising a subquery that is not in said query;
   determining a result set for said subquery;
   evaluating said result set to identify a first set of partitions relevant to said query; and
   pruning a second set of partitions not relevant to said query.

2. The method of claim 1 in which said first database object comprises a first table and said second database object comprises a second table.

3. The method of claim 2 in which said subquery comprises a single table predicate upon a partitioning column of said first table.

4. The method of claim 2 in which said subquery is composed based upon a join predicate in said query between said first table and said second table.

5. The method of claim 2 in which said subquery is directed to a partitioning column of said first table.

6. The method of claim 5 in which a second subquery is added to said query, said second subquery directed to a second partitioning column of said first table, said second subquery associated with a second result set.

7. The method of claim 6 further comprising:
   evaluating said result set against said second result set to determine said first set of partitions.

8. The method of claim 7 in which evaluating said result set against said second result set comprises the action of calculating a Cartesian product of the result sets.

9. The method of claim 2 in which said first table is a fact table and said second table is a dimension table associated with said fact table.

10. The method of claim 9 in which said transformed query is substantially constrained such that:
    fact_table.f_column1=ANY (SELECT dimension1.p_column from dimension1 WHERE dimension1.column OPERATOR Value1)
    where fact_table refers to said fact table, f_column1 refers to a foreign key/column in said fact table, dimension1 refers to said dimension table, p_column refers to a primary key/column in said dimension table, column refers to a column in said dimension table, and Value1 refers to a constraint value against said column.

11. The method of claim 9 in which said transformed query is substantially constrained such that:
    fact_table.f_column1 IN (SELECT dimension1.p_column from dimension1 WHERE dimension1.column OPERATOR Value1)
    where fact_table refers to said fact table, f_column1 refers to a foreign key/column in said fact table, dimension1 refers to said dimension table, p_column refers to a primary key/column in said dimension table, column refers to a column in said dimension table, and Value1 refers to a constraint value against said column.

12. The method of claim 9 in which said first table is partitioned based upon a foreign key joined with a primary key of a second dimension table.

13. The method of claim 12 in which said transformed query is substantially constrained such that:
    fact_table.foreign column=ANY (SELECT dimension_level_1.primary column FROM dimension_level_1, dimension_level_2 WHERE dimension_level_2.primary column AND dimension_level_2.column OPERATOR Value)
    where Fact_table refers to said Fact table, dimension_level_1 refers to said dimension table and dimension_level_2 refers to said second dimension table.

14. The method of claim 1 in which said first database object comprises a partitioned index.

15. The method of claim 1 in which a cost-benefit analysis is performed to determine a number of subqueries added to said query.

16. The method of claim 15 in which said cost-benefit analysis is performed to determine when to stop generating subquery predicates on partitioning columns.

17. The method of claim 16 in which multiple predicates may be generated for a same column, wherein one of said multiple predicates is chosen based upon having lower relative cost or higher relative benefit.

18. The method of claim 1 in which said action of evaluating said result set to identify said first set of partitions relevant to said query is performed by mapping said result set to said partition definitions.

19. The method said claim 1 in which said query references a plurality of levels of dimension tables.

20. The method of claim 1 in which said first and second sets of partitions are based upon composite partitioning, wherein said act of transforming said query is performed for each partitioning dimension for said first and second sets of partitions.

21. A computer program product that includes a medium usable by a processor, the medium having stored thereon a sequence of instructions which, when executed by said processor, causes said processor to execute a process for executing a query, the query comprising a non-single table predicate that references a first database object and a second database object, said process comprising:
   transforming said query into a transformed query that includes a new predicate, said new predicate corresponding to said non-single table predicate, said new predicate comprising a subquery that is not in said query;
   determining a result set for said subquery;
   evaluating said result set to identify a first set of partitions relevant to said query; and
   pruning a second set of partitions not relevant to said query.

22. The computer program product of claim 21 in which said first database object comprises a first table and said second database object comprises a second table.

23. The computer program product of claim 22 in which said subquery comprises a single table predicate upon a partitioning column of said first table.

24. The computer program product of claim 22 in which said subquery is composed based upon a join predicate in said query between said first table and said second table.

25. The computer program product of claim 22 in which said subquery is directed to a partitioning column of said first table.

26. The computer program product method of claim 25 in which a second subquery is added to said query, said second subquery directed to a second partitioning column of said first table, said second subquery associated with a second result set.

27. The computer program product method of claim 26 further comprising:
evaluating said result set against said second result set to determine said first set of partitions.

28. The computer program product of claim 27 in which evaluating said result set against said second result set comprises the action of calculating a Cartesian product of the result sets.

29. The computer program product of claim 22 in which said first table is a fact table and said second table is a dimension table associated with said fact table.

30. The computer program product of claim 29 in which said transformed query is substantially constrained such that:
fact_table.f_column1=ANY (SELECT dimension1.p_column from dimension1 WHERE dimension1.column OPERATOR Value1)
where fact_table refers to said fact table, f_column1 refers to a foreign key/column in said fact table, dimension1 refers to said dimension table, p_column refers to a primary key/column in said dimension table, column refers to a column in said dimension table, and Value1 refers to a constraint value against said column.

31. The computer program product of claim 29 in which said transformed query is substantially constrained such that:
fact_table.f_column1 IN (SELECT dimension1.p_column from dimension1 WHERE dimension1.column OPERATOR Value1)
where fact_table refers to said fact table, f_column1 refers to a foreign key/column in said fact table, dimension1 refers to said dimension table, p_column refers to a primary key/column in said dimension table, column refers to a column in said dimension table, and Value1 refers to constraint value against said column.

32. The computer program product of claim 29 in which said first table is partitioned based upon a foreign key joined with a primary key of a second dimension table.

33. The computer program product of claim 29 in which said transformed query is substantially constrained such that:
fact_table.foreign column=ANY (SELECT dimension_level_1.primary column FROM dimension_level_1, dimension_level_2 WHERE dimension_level_2.primary column AND dimension_level_2.column OPERATOR Value)
where Fact_table refers to said Fact table, dimension_level_1 refers to said dimension table and dimension_level_2 refers to said second dimension table.

34. The computer program product of claim 21 in which said first database object comprises a partitioned index.

35. The computer program product of claim 21 in which a cost-benefit analysis is performed to determine the number of subqueries are added to said query.

36. The computer program product of claim 35 in which said cost_benefit analysis is performed to determine when to stop generating subquery predicates on partitioning columns.

37. The computer program product of claim 36 in which multiple predicates may be generated for a same column, wherein one of said multiple predicates is chosen based upon having lower relative cost or higher relative benefit.

38. The computer program product of claim 21 in which said action of evaluating said result set to identify said first set of partitions relevant to said query is performed by mapping said result set to said partition definitions.

39. The computer program product of claim 38 in which said query references a plurality of hierarchical levels of dimension tables.

40. The computer program product of claim 21 in which said first and second sets of partitions are based upon composite partitioning, wherein said act of transforming said query is performed for each partitioning dimension for said first and second sets of partitions.

41. A system for executing a query, the query comprising a non-single table predicate that references a first database object and a second database object, the method comprising:
means for transforming said query into a transformed query that includes a new predicate, said new predicate corresponding to said non-single table predicate, said new predicate comprising a subquery that is not in said query;
means for determining a result set for said subquery;
means for evaluating said result set to identify a first set of partitions relevant to said query; and
means for pruning a second set of partitions not relevant to said query.

42. The system of claim 41 in which said first database object comprises a first table and said second database object comprises a second table.

43. The system of claim 42 in which said subquery comprises a single table predicate upon a partitioning column of said first table.

44. The system of claim 42 in which said subquery is composed based upon a join predicate in said query between said first table and said second table.

45. The system of claim 42 in which said subquery is directed to a partitioning column of said first table.

46. The system of claim 45 in which a second subquery is added to said query, said second subquery directed to a second partitioning column of said first table, said second subquery associated with a second result set.

47. The system of claim 46 further comprising:
means for evaluating said result set against said second result set to determine said first set of partitions.

48. The system of claim 47 in which evaluating said result set against said second result set comprises the action of calculating a Cartesian product of the result sets.

49. The system of claim 42 in which said first table is a fact table and said second table is a dimension table associated with said fact table.

50. The system of claim 49 in which said transformed query is substantially constrained such that:
fact_table.f_column1=ANY (SELECT dimension1.p_column from dimension1 WHERE dimension1.column OPERATOR Value1)
where fact_table refers to said fact table, f_column1 refers to a foreign key/column in said fact table, dimension1 refers to said dimension table, p_column refers to a primary key/column in said dimension table, column refers to a column in said dimension table, and Value1 refers to a constraint value against said column.

51. The system of claim 49 in which said transformed query is substantially constrained such that:

fact_table.f_column1 IN (SELECT dimension1.p_column from dimension1 WHERE dimension1.column OPERATOR Value1)

where fact_table refers to said fact table, f_column1 refers to a foreign key/column in said fact table, dimension1 refers to said dimension table, p_column refers to a primary key/column in said dimension table, column refers to a column in said dimension table, and Value1 refers to constraint value against said column.

52. The system of claim 49 in which said first table is partitioned based upon a foreign key joined with a primary key of a second dimension table.

53. The system of claim 52 in which said transformed query is substantially constrained such that:

fact_table.foreign column=ANY (SELECT dimension_level_1.primary column FROM dimension_level_1, dimension_level_2 WHERE dimension_level_2.primary column AND dimension_level_2.column OPERATOR Value)

where Fact_table refers to said Fact table, dimension_level_1 refers to said dimension table and dimension_level_2 refers to said second dimension table.

54. The system of claim 41 in which said first database object comprises a partitioned index.

55. The system of claim 41 in which a cost-benefit analysis is performed to determine a number of subqueries added to said query.

56. The system of claim 55 in which said cost-benefit analysis is performed to determine when to stop generating subquery predicates on partitioning columns.

57. The system of claim 56 in which multiple predicates may be generated for a same column, wherein one of said multiple predicates is chosen based upon having lower relative cost or higher relative benefit.

58. The system of claim 41 in which said action of evaluating said result set to identify said first set of partitions relevant to said query is performed by mapping said result set to said partition definitions.

59. The system said claim 41 in which said query references a plurality of levels of dimension tables.

60. The system of claim 41 in which said first and second sets of partitions are based upon composite partitioning, wherein said act of transforming said query is performed for each partitioning dimension for said first and second sets of partitions.

* * * * *